(12) United States Patent
Charney et al.

(10) Patent No.: US 6,418,525 B1
(45) Date of Patent: Jul. 9, 2002

(54) METHOD AND APPARATUS FOR REDUCING LATENCY IN SET-ASSOCIATIVE CACHES USING SET PREDICTION

(75) Inventors: Mark J. Charney, New York, NY (US); Philip G. Emma, Danbury, CT (US); Daniel A. Prener, Croton-on-Hudson, NY (US); Thomas R. Puzak, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,348

(22) Filed: Jan. 29, 1999

(51) Int. Cl.[7] .................................................. G06F 12/08
(52) U.S. Cl. ........................ 711/213; 711/128; 711/204
(58) Field of Search ............................... 711/128, 137, 711/204, 205, 213

(56) References Cited

U.S. PATENT DOCUMENTS

| | | | |
|---|---|---|---|
| 5,148,538 A | * 9/1992 | Celtruda et al. | 711/205 |
| 5,235,697 A | 8/1993 | Steely, Jr. et al. | 395/425 |
| 5,418,922 A | * 5/1995 | Liu | 711/3 |
| 5,634,119 A | 5/1997 | Emma et al. | 395/587 |
| 5,845,323 A | * 12/1998 | Roberts et al. | 711/128 |
| 5,918,245 A | * 6/1999 | Yung | 711/122 |
| 5,956,752 A | * 9/1999 | Mathews | 711/204 |
| 5,966,737 A | * 10/1999 | Steely, Jr. et al. | 711/213 |
| 6,115,792 A | * 9/2000 | Tran | 711/128 |

OTHER PUBLICATIONS

A.J. Smith, "Cache Memories", Computing Surveys, vol. 14, No. 3, Sep. 1982, pp. 473–479, 516–523.

Carlson et al., "667 MHz RISC Microprocessor Containing a 6.0ns 64b Integer Multiplier", 1998 IEEE International Solid–State Circuits Conference, Digest of Technical Papers, Feb. 1998, pp. 294–295.

Emma et al., "Operand History Table", IBM Technical Disclosure Bulletin, vol. 27, No. 7A, Dec. 1984, pp. 3815–3816.

Cekleov et al., "Virtual–Address Caches, Part 1: Problems and Solutions in Uniprocessors", IEEE Micro, Sep./Oct. 1997, pp. 64–71.

* cited by examiner

Primary Examiner—Do Hyun Yoo
Assistant Examiner—Gary J. Portka
(74) Attorney, Agent, or Firm—F. Chau & Associates, LLP (57) ABSTRACT

A method and apparatus for storing and utilizing set prediction information regarding which set of a set-associative memory will be accessed for enhancing performance of the set-associative memory and reducing power consumption. The set prediction information is stored in various locations including a branch target buffer, instruction cache and operand history table to decrease latency for accesses to set-associative instruction and data caches.

12 Claims, 9 Drawing Sheets

Old Way (PRIOR ART)

```
                    Time -->
                    0    1    2    3    4
Cache Access        A    B    C    D
Array Readout       A    B    C    D
Data Available           A    B    C
V -> R              A    B    C    D
Directory Readout   A
Tag Check           <-A
Late Select              A
```

FIG 8A

New Way

```
                    Time -->
                    0    1    2    3    4
Cache Access        A    B    C    D
Array Readout       A    B    C    D
Data Available           A    B    C
V -> R              A    B    C    D
Directory Readout   A
Tag Check           <-A
Correct/Restart          A
```

Error Case

```
Cache Access    A  B  C  A            (A replaces D)
Array Readout   A  B  C  A            (A replaces D)
Data Available        X  B  C  A      (The X is the replacement of the first A)
```

FIG 8B

METHOD AND APPARATUS FOR REDUCING LATENCY IN SET-ASSOCIATIVE CACHES USING SET PREDICTION

BACKGROUND OF THE INVENTION

1. Technical Field

The present invention relates to computer memory systems; and in particular to a method and apparatus for reducing access latency in set-associative caches.

2. Discussion of Related Art

Cache memory is typically a small, high speed buffer located between the central processing unit (CPU) and main memory. The cache is used to temporarily hold those contents of main memory believed to be currently in use. Decisions regarding when to replace the contents of the cache are generally based on a least recently used (LRU) algorithm. The LRU algorithm causes cache memory locations to be replaced with the contents of main memory that were most recently used. Information in cache memory can be accessed in far less time than information in main memory. Thus, the CPU wastes less time waiting for instructions and/or operands to be fetched and/or stored in cache.

A direct-mapped cache limits the storage of the contents of any particular location in main memory to specific locations in cache. In contrast, an M-way set-associative cache maps the contents of each main memory location into any of M locations in cache. Essentially the M-way set-associative cache is a combination of M identical direct-mapped caches. However, access and retrieval from M-way set-associative caches is more complex. During every memory access to the M-way set-associative cache, each of the combination of M identical direct-mapped caches must be searched and the appropriate data selected and multiplexed to the output if there is a match. If a miss occurs, then a choice must be made between M possible cache lines as to which cache line must be deleted and rewritten with more recently used contents of main memory.

Figure 1:
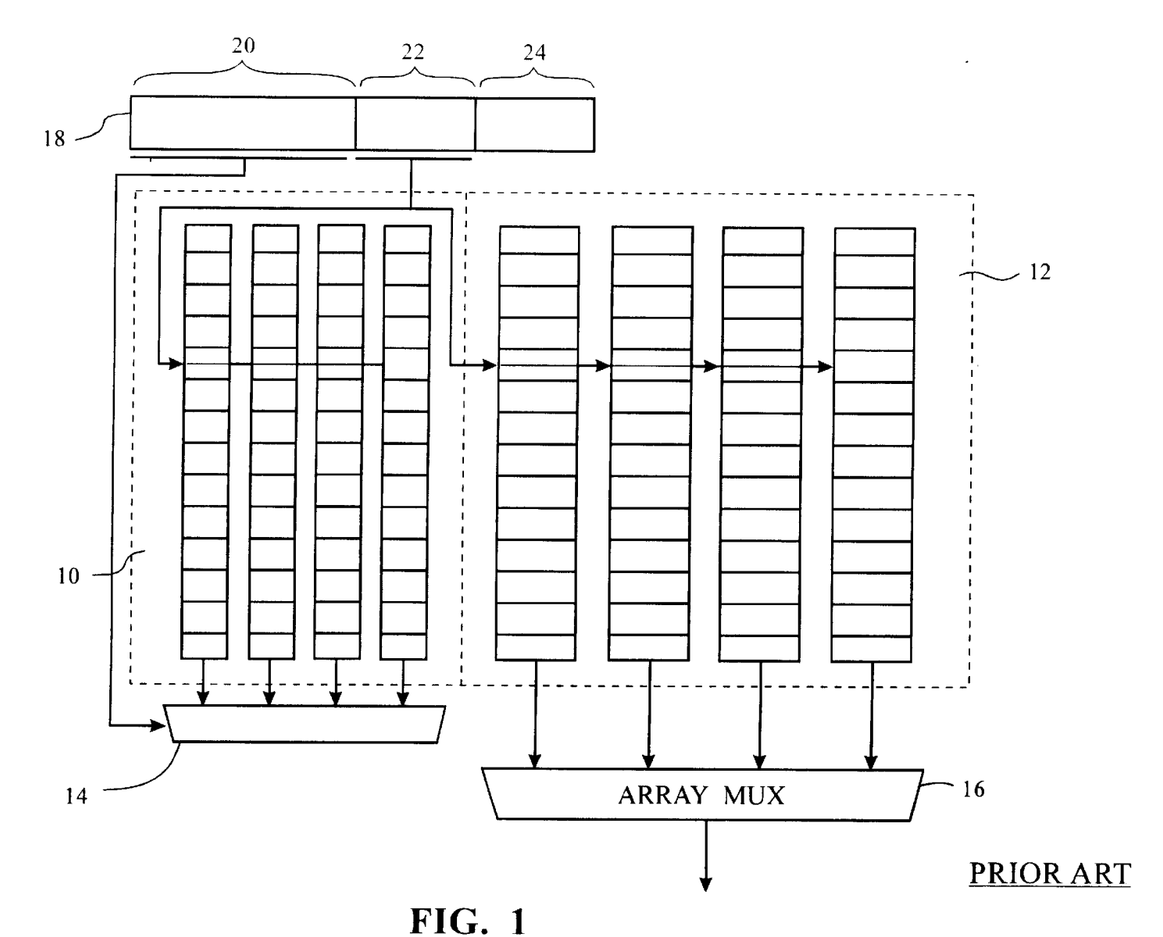
FIG. 1 is a block diagram of a virtually-tagged cache of the prior art.

FIG. 1 illustrates a virtually-tagged 4-way set-associative cache memory of the prior art comprising a cache directory 10, a cache array 12, a directory mux 14 and an array mux 16. The cache directory 10 comprises virtual addresses for each corresponding location in the cache array 12. The cache array 12 stores the contents of the main memory location pointed to by the corresponding location or block in the cache directory 10. A set is defined as a column in the cache array 12 and the corresponding column in the cache directory 10. A congruence class is defined as a row in the cache array 12 and the corresponding row in the cache directory 10. A block or a location is defined as the intersection of a particular set (column) and a particular congruence class (row). A location or block comprises one or more bytes of data.

An address 18 supplied to the cache memory comprises a directory tag 20, a congruence class 22 and a block offset 24. The directory tag 20 is used to select the desired set (column) in the cache directory 10 via the directory mux 14. The congruence class tag 22 is used to select the desired congruence class (row) of both the cache directory 10 and the cache array 12. The block offset 24 is used to select the desired byte within the desired block or location. The output of the directory mux 14 is used to select the desired set (column) of the cache array 12 via the array mux 16.

The latency in accessing associative caches is higher than the latency in accessing direct-mapped caches due to the necessity of comparing the address against the tags stored across multiple sets of the cache directory 10. If a match occurs, the set associated with the matching tag is used to select output from the corresponding set of the cache array 12. The output of the cache array 12 is ultimately routed to registers and functional units. The so-called "late select problem" refers to the need for addresses to go through a cache directory 10 lookup and potentially address translation (if a physically-tagged cache is used) before the appropriate set of the cache array 12 can be selected. Thus, the late select problem adversely impacts latency in a set-associative cache.

Therefore, it would be advantageous if set selection information could be made available prior to searching the cache directory and translating the address.

Further details regarding caches can be found in the following references, which are hereby incorporated by reference:

1. U.S. Pat. No. 5,634,119 to Emma et al.
2. Chang, Sheldon S. L. *Electrical and Computer Engineering* III (1983).
3. Smith, Allan J. *Cache Memories—ACM Computing Surveys* Vol. 14 (1982).
4. Cekleov M. and Dubois M. *Virtual-Address Caches—IEEE Micro* (1997).

SUMMARY OF THE INVENTION

In accordance with illustrative embodiments of the present invention, a method for reducing access latency in set-associative caches is provided wherein data is read from locations of a memory selectable through at least one selecting cache, the method comprising the steps of generating set selection information, and storing the set selection information in a location that enables the set selection information to be made available for retrieval of data from the memory prior to the arrival of memory select information from the selecting cache.

An apparatus for reducing access latency in set-associative caches comprising a storage for storing set selection information; an M-way set-associative cache receiving an address and outputting M-sets of data determined by the address; and a multiplexor for multiplexing one of set selection information and set associative address, wherein said set selection information is made available prior to said set associative address for accessing said data.

An apparatus for reducing power consumption of set-associative caches comprising a set selection storage for storing set selection information; an M-way set-associative cache comprising an array and a directory, the directory outputting a set-associative tag portion of an address to the array; and a multiplexer for multiplexing one of said tag portion of an address from said directory and said set selection information for outputting one set of said M-sets of data.

Further in accordance with the present invention, a method of increasing the access speed of a set-associative memory using data addresses is provided. The addresses comprise an offset portion, a congruence class index, and a tag portion. The set associative memory comprises an array and a directory. The array stores data, and is partitioned into a plurality of array congruence classes. The array congruence class is partitioned into array sets. The array set comprises a cache line. The cache line comprises a plurality of data. The directory is partitioned into a plurality of directory congruence classes. The directory congruence class is partitioned into directory sets, each comprising a directory entry. The directory entry comprises an address tag and other status information including valid bits, parity, etc. The directory is partitioned such that there is a one-to-one correspondence between the directory entries and the cache lines such that the address tags are associated with one of the cache lines.

Preferably, the method comprises the steps of accessing contents of sets of a single array congruence class using the congruence class index, the single array congruence class being specified by the congruence class index, accessing contents of sets of a single directory congruence class using the congruence class index, the single directory congruence class being specified by the congruence class index, generating set selection information, utilizing the set selection information to select the sets of the array congruence class, outputting the data from the cache line in the selected set; comparing the tag portion to the address tags of the selected sets of the directory congruence class, comparing the selected set to the set selection information if one of the address tags in the selected congruence class is equal to the tag portion of the address, outputting a first control signal to indicate that the access was unsuccessful, and that the data output from the cache line is invalid if none of the address tags in the selected congruence class is equal to the tag portion of the address, and outputting a second control signal to indicate that the data from the cache line is invalid if the selected set is not equal to the set selection information.

In further accordance with the present invention, an apparatus for reducing access time in a set-associative memory using data addresses is provided. The address comprises an offset portion, a congruence class index, and a tag portion. The set-associative memory comprises an array and a directory, wherein the array comprises data. The array is partitioned into a plurality of array congruence classes. The array congruence class is partitioned into array sets, and the array sets determine set-associativity of the set-associative memory. The array set comprises a cache line, and the cache line comprising a plurality of data. The directory is partitioned into a plurality of directory congruence classes. The directory congruence class is partitioned into directory sets. The directory set comprises a directory entry, and the directory entry comprises an address tag. The directory being partitioned such that there is a one-to-one correspondence between the directory entries and the cache lines such that the address tags in the directory are associated with at least one of the cache lines. The apparatus for reducing access time in the set-associative memory comprises means for accessing contents of sets of the array congruence class, the single array congruence class being that congruence class specified by the congruence class index, means for accessing contents of sets of a single directory congruence class, the single directory congruence class being that congruence class specified by the congruence class index, means for generating set selection information, means for selecting one of the sets of the single array congruence class using the set selection information, means for outputting the data from the cache line in the selected set, means for comparing the tag portion of the address to the address tags from the sets of the selected single directory congruence class, means for comparing the set comprising the address tag equal to the set selection information, and means for outputting a control signal indicating success of the data access, and validity of the data output from the cache line.

DETAILED DESCRIPTION OF PREFERRED EMBODIMENTS

The use of set prediction removes the need to wait for the late select stage of set-associative cache accesses. The present invention discloses embodiments for using set selection information for set prediction to improve the performance of instruction and data caches.

Figure 2:
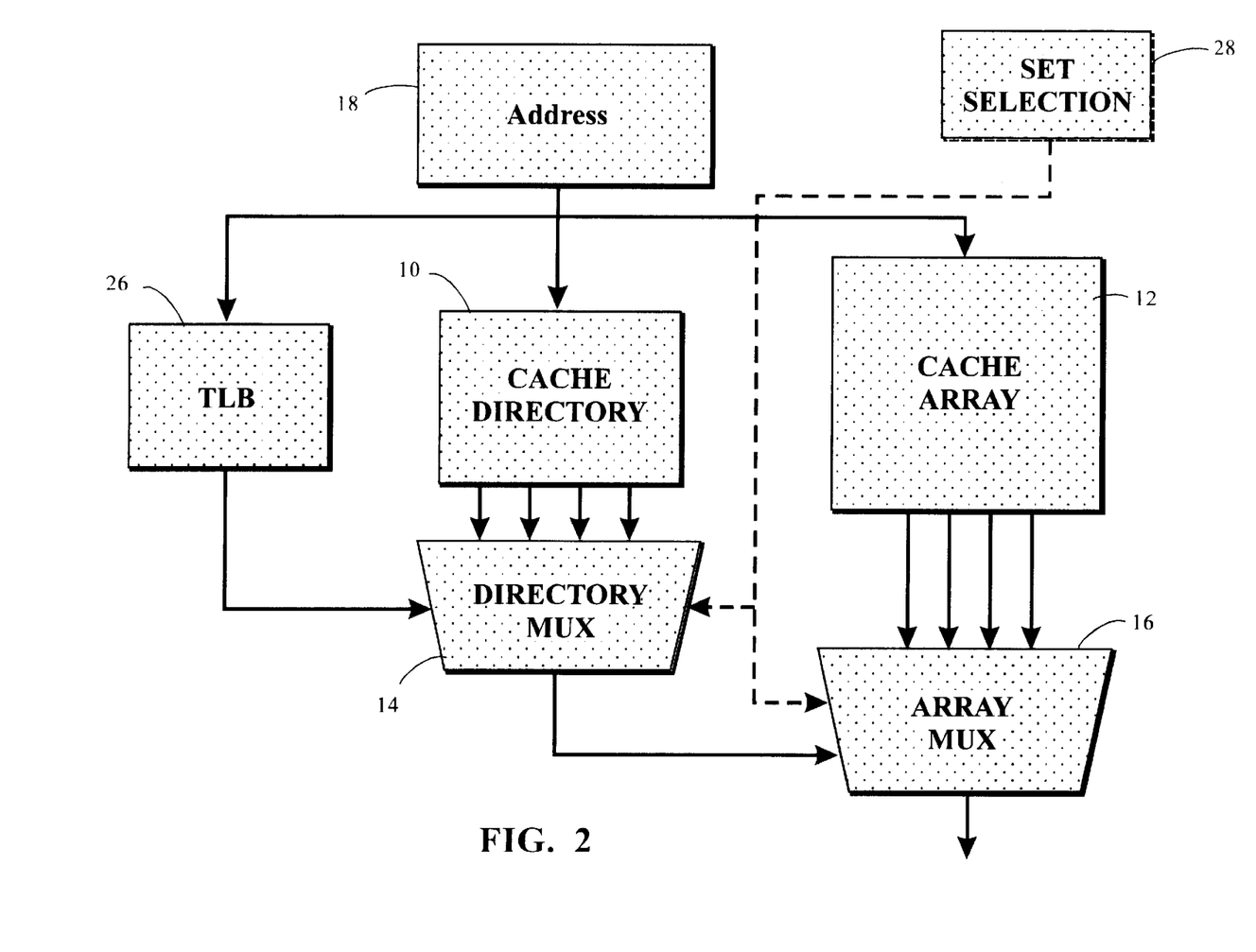
FIG. 2 is a block diagram indicating application of the present invention to a physically-tagged set-associative cache.

FIG. 2 illustrates a block diagram of an embodiment of the present invention. As shown, set selection 28 is applied directly to the directory mux 14 and array mux 16 in a physically-addressed set-associative cache. In contrast to the virtually-addressed cache illustrated in FIG. 1, the physically-addressed cache illustrated in FIG. 2 includes a translation look aside buffer (TLB) 26 to translate the virtual address 18 to a physical address used by the cache directory 10. By providing set selection 28 directly to the array mux 16, data can be retrieved from the cache array 12 prior to the availability of mux select data from directory mux 14 to array mux 16.

According to an illustrative embodiment of the present invention, data for set selection 28 can be stored or derived from a plurality of sources including a Branch Target Buffer BTB (also referred to as Branch History Table BHT), Operand History Table, or Instruction Cache.

The BTB is a buffer used to predict the target address for branch instructions. The theory behind the BTB is that most branches are either taken or not taken, and if taken will have the same target address. Therefore, a table of taken branches is established in which each entry of the table comprises the address of the taken branch followed by the target address of the branch. Entries in the table are established as a branch is made. When the table is full, adding a new entry typically involves replacing an old entry via an LRU algorithm.

Figure 5A:
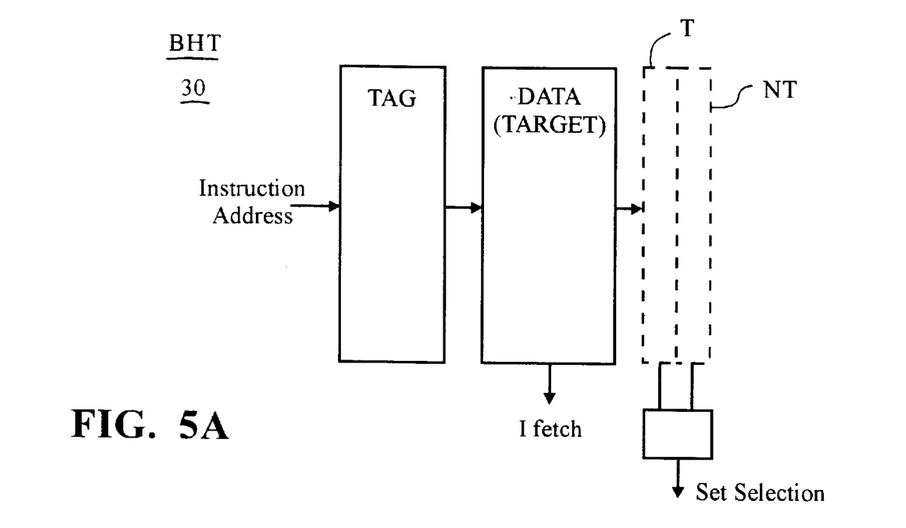
FIGS. 5A, 5B and 5C illustrate use of a branch history table, an instruction cache, and operand history table, respectively, as storage for set selection information in the present invention.

Referring to FIG. 5A, an illustration of a use of the BHT 30 as a location for storing set selection information. During instruction execution, each branch is referenced in the BHT 30 using the branch address and if it is found, its target address is fetched (Ifetch) and becomes the next instruction in the execution stream. If the branch address is not found in the BHT, it is presumed not taken (NT). As execution of branch instructions continue, the table is updated accordingly. If a branch predicted to be taken is not taken, the corresponding BTB entry is deleted. If a branch predicted not to be taken is taken, a new entry is established. If the predicted target address is incorrect, the corrected address is entered.

Each entry of the BHT 30 holds the address of a branch, the corresponding branch target address and set selection information. Each branch is accessed with an instruction address, derived from a program counter. The set selection information indicates which set last included the instructions pointed to by a specific BHT entry and is used to predict the appropriate set to be fetched from the instruction cache upon encountering the branch corresponding to that BHT entry. The branch address to be fetched is derived from a program counter and compared to branch addresses in the BHT 30. If a match is found then the corresponding branch target address and set selection information is provided to the instruction cache. Thus, by using the set predicted from the set selection information stored in the BHT, the appropriate instruction can be fetched from the instruction cache earlier than if the output of the TLB and cache directory were relied upon to select the appropriate set.

Figure 2A:
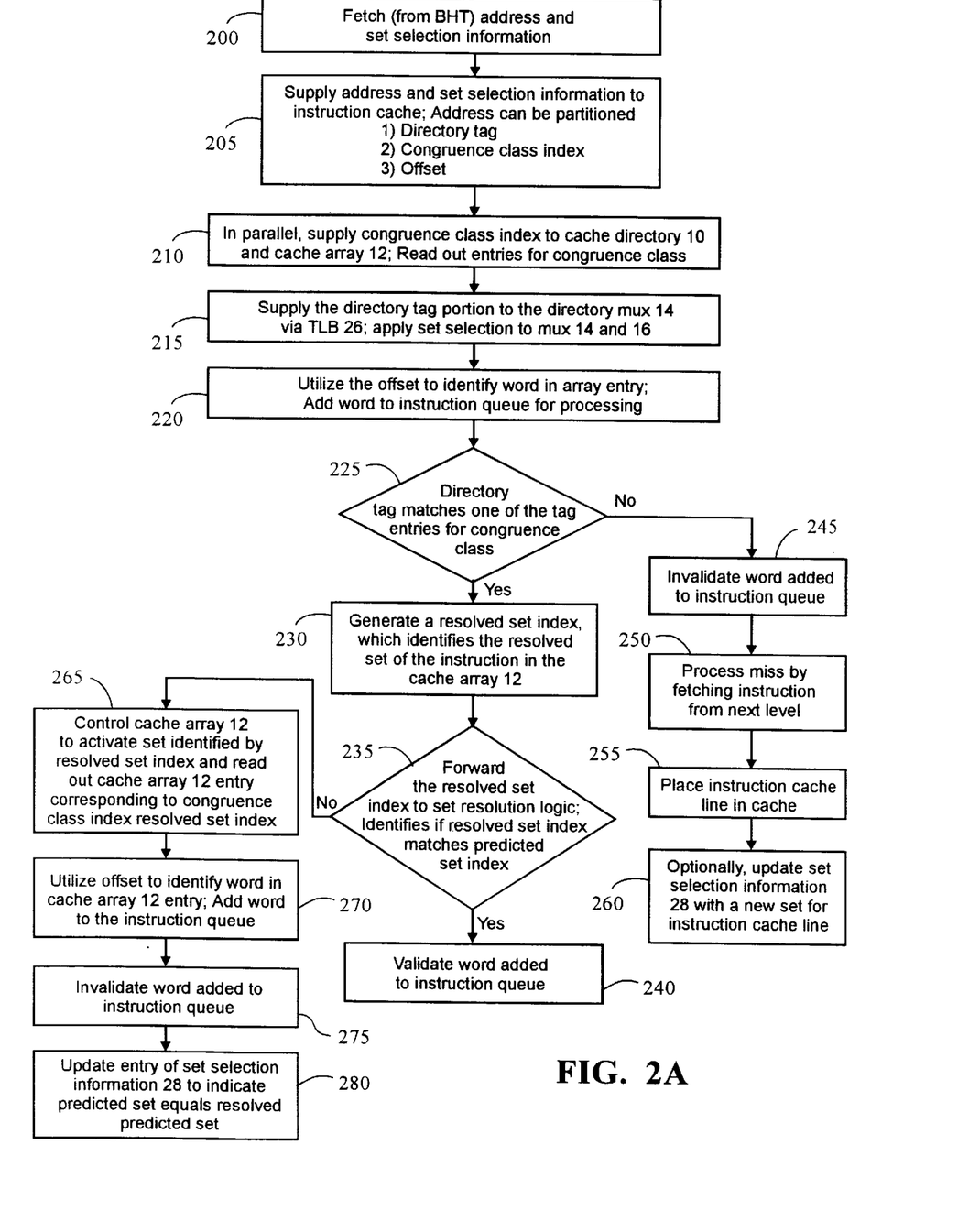
FIG. 2A is an exemplary flow diagram of an application of the method according to the present invention.

An embodiment of the present invention implementing Set Selection from a BHT is described with reference to the block diagram of FIG. 2 and the flow diagram of FIG. 2A:

Fetch from a program counter instruction fetch address (typically a program location corresponding to a branch instruction or instruction fetch group that is predicted to include a branch instruction) to Branch History Table (BHT), which provides a branch target address and a predicted set index that identifies a predicted set of branch targets in an instruction cache (step 200), the predicted set index serves as set selection 28 in FIG. 2;

- supply branch target address to the instruction cache at address 8; the target address may be partitioned into 3 portions: portion 1—directory tag; portion 2—congruence class index; portion 3—offset of instruction (step 205);
- in parallel, supply the congruence class index to the cache directory 10 and cache array 12; read out directory and array entries for the congruence class; supply the directory tag portion to the directory mux 14 via TLB 26 and supply the set selection 28 to the directory mux 14 and the array mux 16. The set selection selects the array mux 16 to output the appropriate array entry (from the set of array entries for the congruence class read out in step 3)(step 210);
- utilize the offset to identify the word output from the cache array 12, and add the word(s) to the instruction queue (or buffer) for processing (step 220);
- directory mux 14 identifies if the directory tag from set selection 28 matches one of the tag entries for the congruence class read in step 210 from cache directory 10 (step 225);

If a mismatch (a cache miss) occurs: invalidate the word(s) added to the instruction queue in step 220 (step 245); process miss conventionally, e.g. by fetching instruction/data from the next level memory hierarchy (step 250); place the instruction cache line in cache (step 255); update BHT with a new set of instruction cache line. Techniques for updating sources of prediction are known to one ordinarily skilled in the art. Preferably, to perform such an update in this example, record the coordinates of the original BHT entry used for the prediction (step 260);

If in step 225, the directory tag from set selection 28 matches tag supplied from TLB 26,(a cache hit), whether the prediction is correct still needs to be determined:

- generate a resolved set index, which identifies the resolved set of the instruction in the cache array 12 identified by the set of the matching directory tag (step 230); in parallel, forward the resolved set index to the array mux 16 and set prediction resolution logic (not shown) and use the resolved set index to control the array mux 16 to select the appropriate array entry (from the set of array entries for the congruence class read out in step 210) (step 235);
- the prediction resolution logic identifies if the resolved set index matches the predicted set index from set selection 28:

If a match occurs (prediction correct), disable operation of the array mux 16 by selecting the entry corresponding to the resolved set index and validate the word added to the instruction queue in step 220 (step 240);

If a mismatch occurs (prediction incorrect), invalidate the word(s) added to the instruction queue (step 270); utilize the offset to identify the word(s) in the cache array 12 identified in step 240, and add the word(s) to the instruction queue (step 275); and update the entry of the set selection information 28 to indicate that the new predicted set equals the resolved predicted set (step 280).

It is readily apparent to one ordinarily skilled in the art that in the above-described embodiment of the invention, the BHT includes a set-prediction field attached to every buffer or location in the BHT. By use of set selection or set-prediction coupled with the branch target (address), data can be retrieved from the instruction cache without waiting for translation or directory lookup generation of the late-select signal (through TLB 26, cache directory 10 and directory mux 14).

Optionally, additional set selection information can be allocated for each BHT entry. The additional set selection information could specify an appropriate set for a fall-through or not-taken path. Such information is useful when recovering from incorrectly predicted branches or when the branch instruction occupies the last location in a cache block and the fall-through path is stored in a different cache block. Upon detection that the target and fall-through paths are in different cache sets, both sets may be fetched simultaneously from the instruction cache. In addition, since multiple branches can occur within a single instruction cache line, additional set selection information in the BTB can also provide fields for each branch.

Figure 5B:
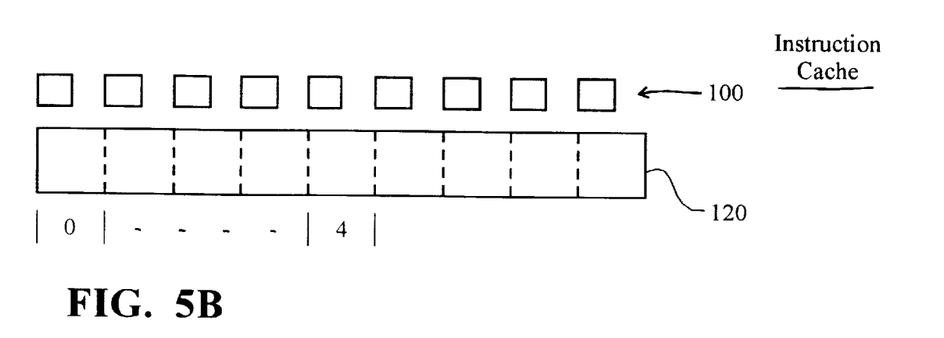

Alternatively, set selection information can be stored in the instruction cache to improve performance of data caches. Referring to FIG. 5B, data cache set selection information 100 can be appended to the instruction cache line 120 indicating the predicted set of the operands required by the instruction. As shown in FIG. 5B, D-cache set selection are associated with corresponding fixed portions (0 to 8) of I-cache line 120. The instruction, which can be a load or store instruction, uses the data cache set selection information to access the set including the operand to be loaded or stored. Since the data cache set selection information is available during access of the instruction cache, which is prior to operand address generation, the performance of data caches can be significantly improved via this method.

Figure 6:
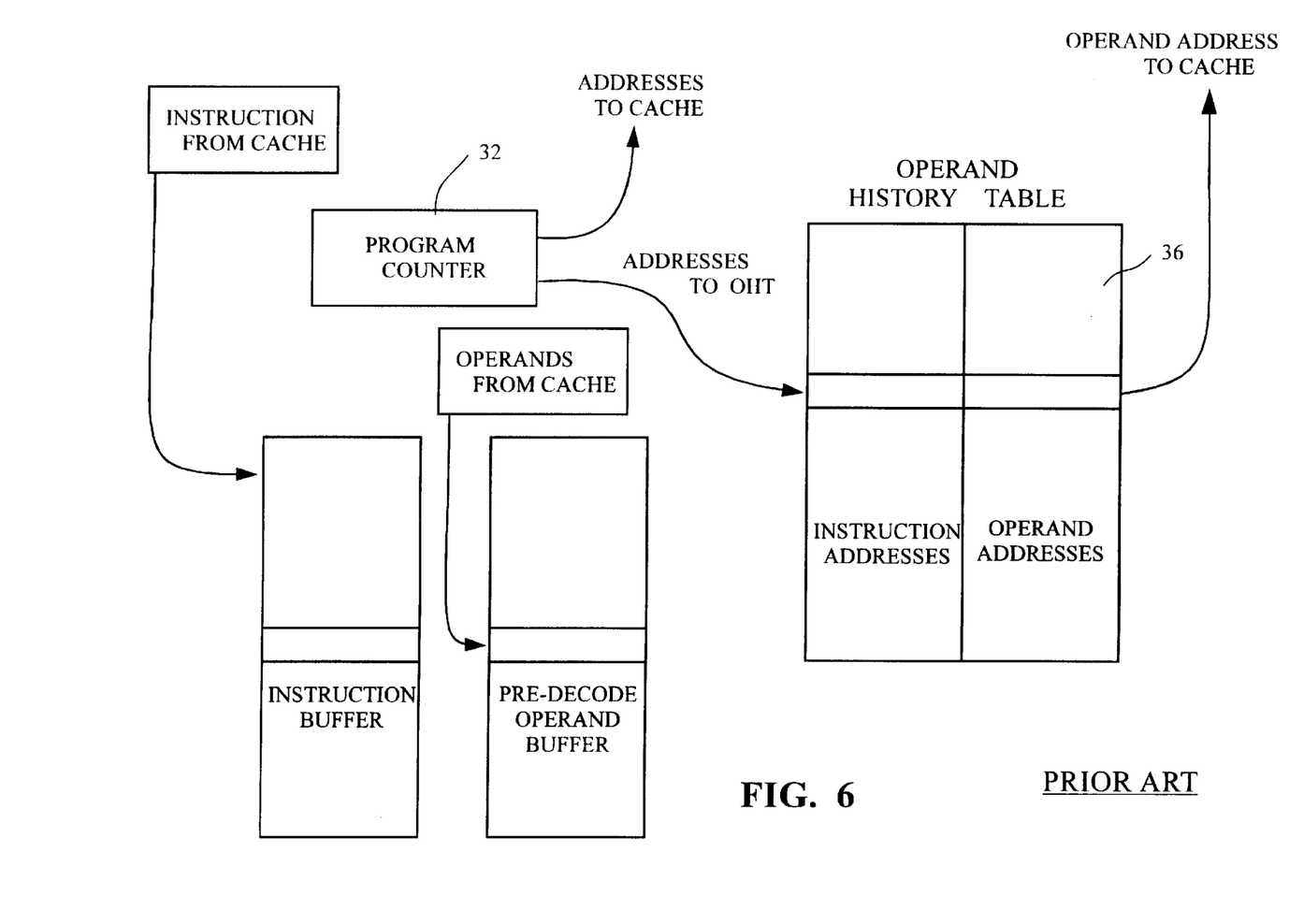
FIG. 6 is a block diagram illustrating the operation of an operand history table of the prior art.

FIG. 6 illustrates operation of an operand history table (OHT) of the prior art. Each instruction address fetched by the program counter 32 is matched against the instruction addresses in the OHT 36. If a match is found, the corresponding operand address is fetched. The operand is then matched with the instruction in the pre-decode operand buffer. When the instruction is decoded, the operand associated with this instruction is available, and execution can begin immediately.

According to another illustrative embodiment of the present invention, set selection information can also be stored in an OHT to improve performance of data caches.

The OHT decreases the time required to fetch operands associated with an instruction. The OHT is based on the theory that many of the instructions requiring an operand compute the same operand address each time the instruction is executed. For instance, an operand address may be computed by adding the base register, index register and displacement field supplied by the instruction. By using a table in which each entry comprises the instruction address and the address of the operand for that instruction, operands can be fetched even before the instruction is decoded.

Figure 5C:
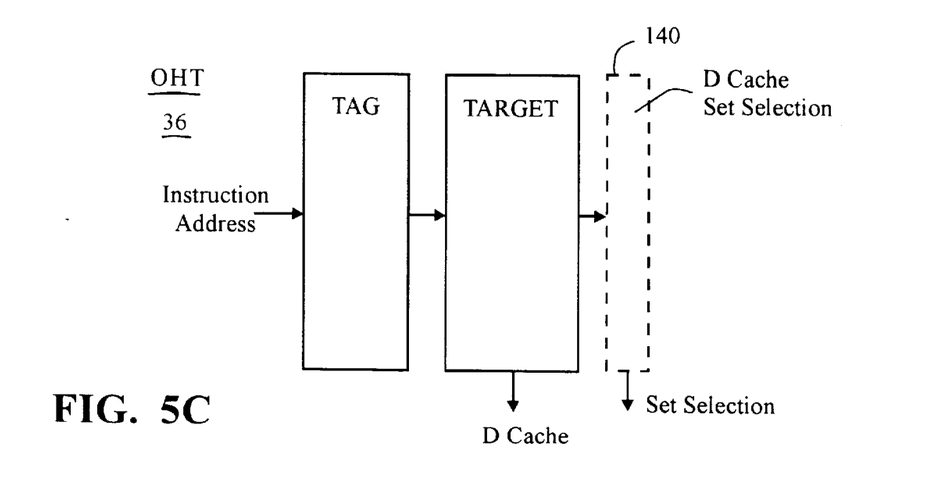

Referring to FIG. 5C, data cache set selection information 140 is appended to each entry of the OHT 36, the address of the appropriate operand is available and the operand can be fetched from the data cache before the instruction is decoded, thus significantly decreasing access latency of the data cache. Since only the program counter is required to access the OHT, the operand can even be fetched prior to fetching the instruction if the system so requires due to, for instance, increased access time for operands.

Figure 3:
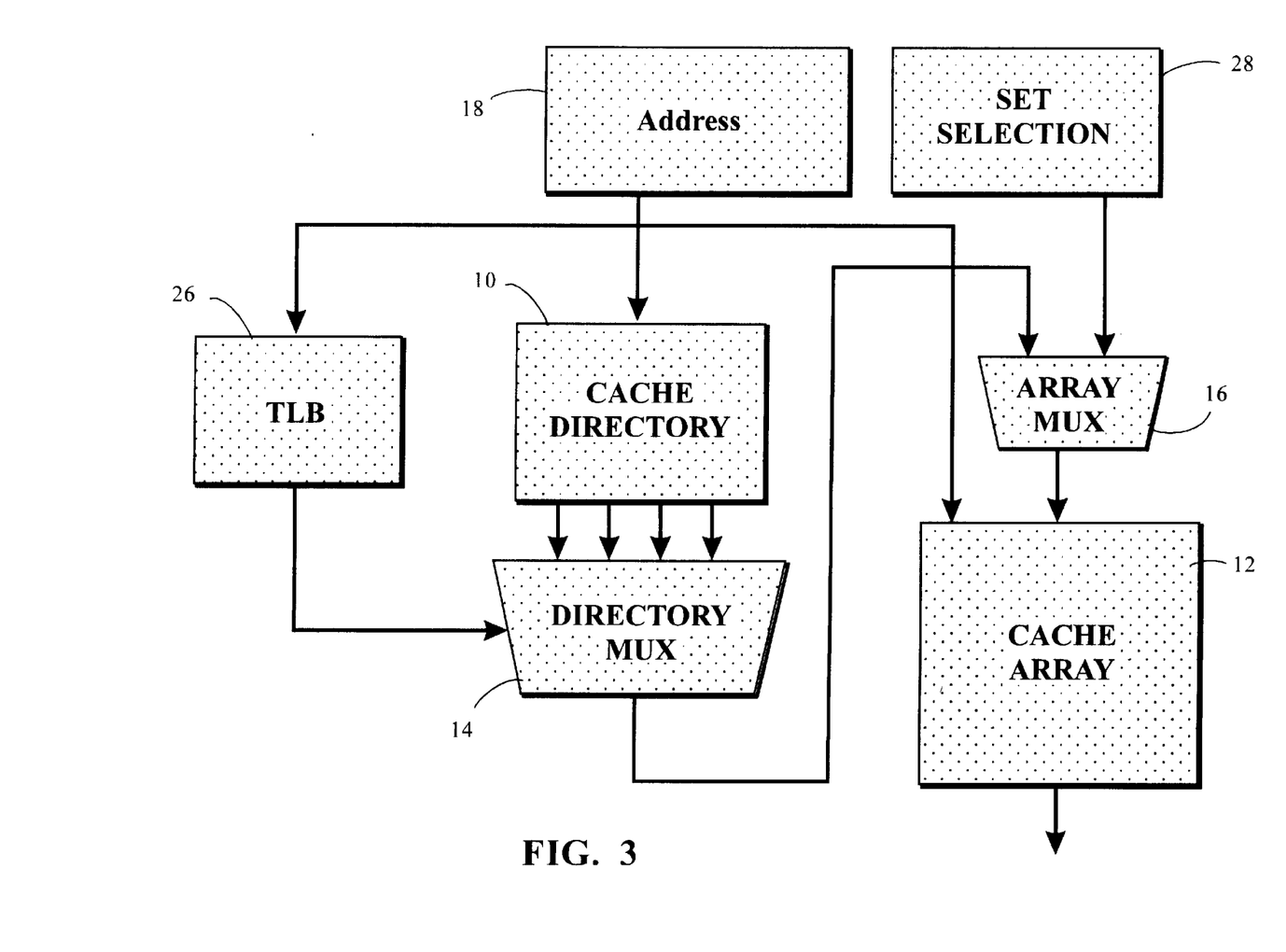
FIG. 3 is a block diagram of a second embodiment of the present invention.

FIG. 3 illustrates an embodiment of the present invention comprising a conventional cache directory 10 and a cache array 12 modified for reduced power consumption. One difference between the first and second embodiments is that the array mux 16 has been moved ahead of the cache array 12 such that the set selection information 28 is used prior to accessing the cache array 12 rather than being used to determine which set will be output following access of the cache array 12. The cache array 12 continues to be set-associative, however, only one set is retrieved from the cache array 12 in any particular cycle. Thus, by reducing the number of sets accessed, power consumption is also reduced. If the set selection information 28 is incorrect, then the late select information from the TLB 26 and cache directory 10 can be used to select and access the correct array information.

Figure 4:
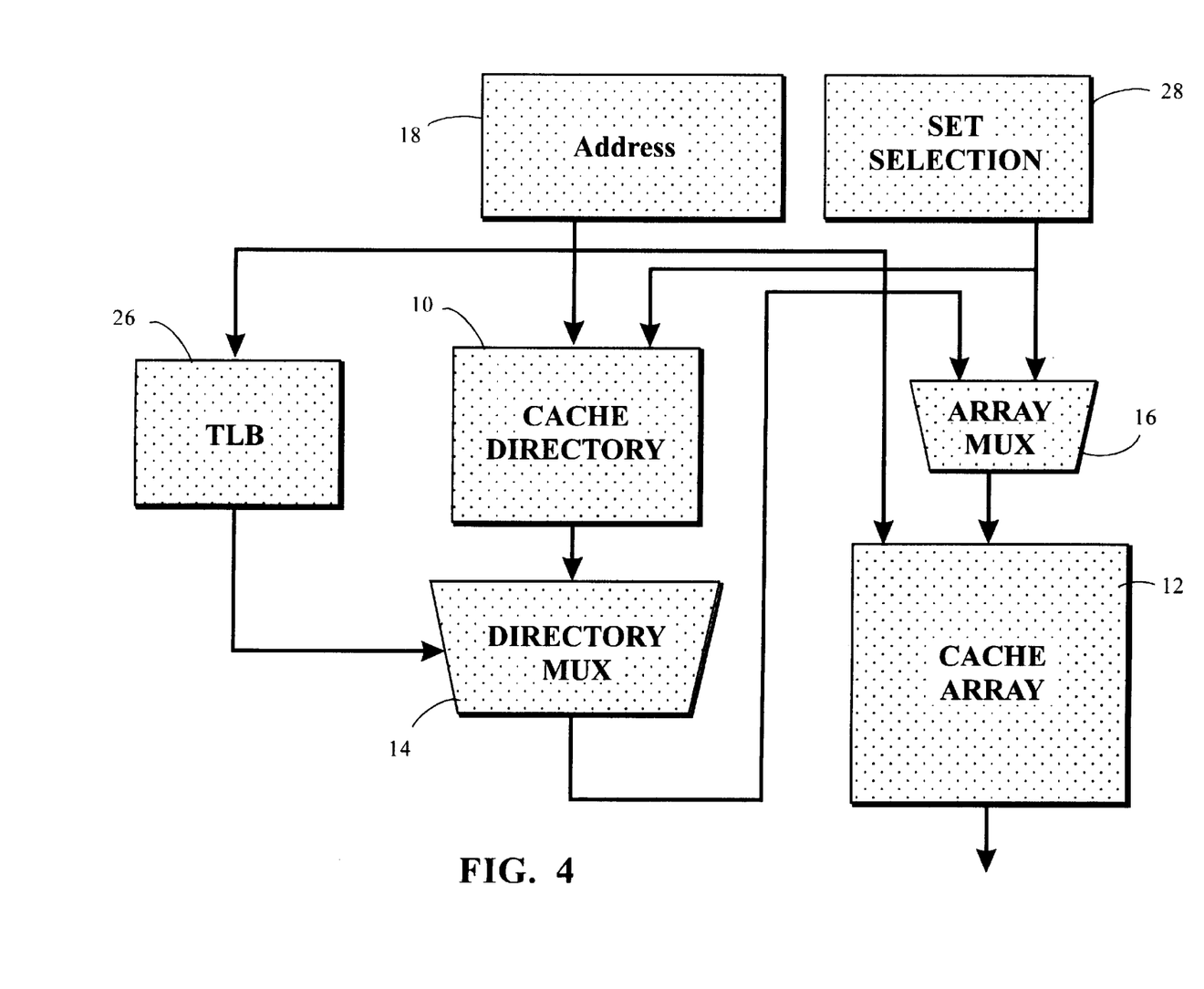
FIG. 4 is a block diagram of a third embodiment of the present invention.

FIG. 4 illustrates an embodiment of the present invention comprising a cache array 12 and a cache directory 10 which are both modified for reduced power consumption. One difference between the second and third embodiments is that the set selection information 28 is used to determine which set of tags to access prior to accessing the cache directory 10 rather than being used to determined which set will be output following access of the cache directory 10. The set selection information 28 is used to select both a set in the cache directory 10 as well as a set in the cache array 12 such that only one set is output from both the cache directory 10 and the cache array 12. Power consumption is reduced by decreasing the number of sets in the cache directory 10 and cache array 12 which must be accessed during accesses to the cache. If the set selection information 28 is incorrect then the late select information from the TLB 26 and cache directory 10 can be used to select and read out the correct array information.

Figure 7:
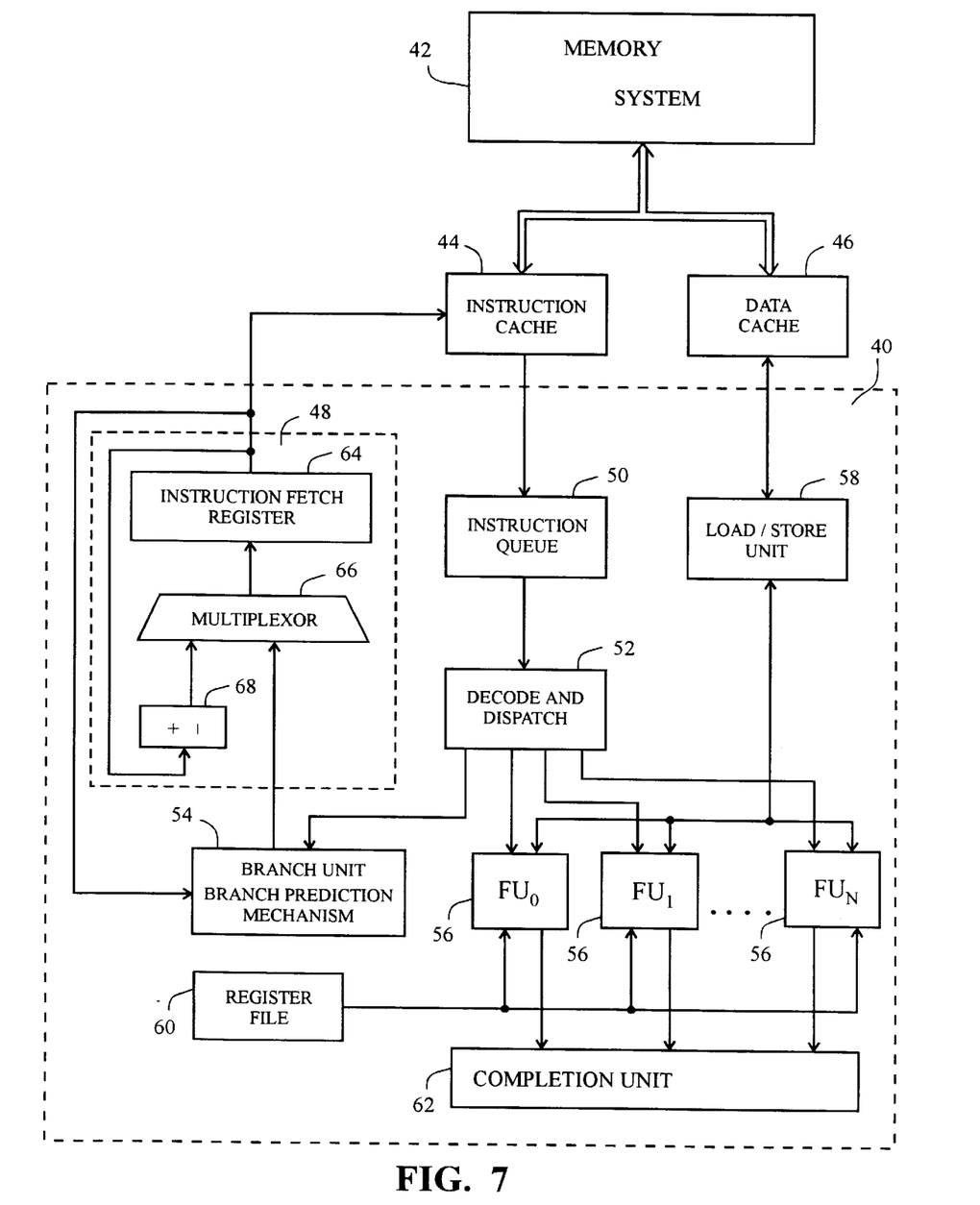
FIG. 7 is a block diagram illustrating application of the present invention in a central processing unit.

FIG. 7 illustrates application of the present invention to a CPU 40. A memory system 42 comprises instruction and program data to be operated on by the CPU 40. The memory system 42 typically has a hierarchical organization that comprises main memory (e.g., dynamic random access memory) and secondary storage (e.g., magnetic/optical disk drives, electrically erasable programmable read only memory).

The memory system 42 is interfaced to an instruction cache 44 and a data cache 46 such that frequently used instructions and data are kept in the instruction cache 44 and data cache 46, respectively. Typically, the instructions and data stored in the caches are divided into cache lines or blocks. An instruction fetch unit 48 fetches one or more blocks of instructions stored in the instruction cache 44 into an instruction queue 50. A decode and dispatch unit 52 reads the instructions from the instruction queue 50, decodes the instructions and schedules the instructions for execution. A detailed description of scheduling techniques can be found in Hennessy and Patterson *Computer Architecture: A Quantitative Approach* pp. 2220–362 (1990), which is hereby incorporated by reference it its entirety. Conditional branch instructions are scheduled for execution on a branch unit 54, and sequential or non-branch instructions are scheduled for execution on functional units 56.

A load store unit 58 fetches blocks of data from the data cache 56 into the functional units 56 as required. The load store unit 58 also updates blocks of data stored in the data cache 56 and memory system 42 based upon data values generated by execution of instructions in the functional units 56. The CPU includes a register file 60 that provides operands to the functional units 56 for executing instructions, and receives the results of the execution. A completion unit 62 completes execution of the instructions in the order considered valid by the particular architecture of the CPU 40. Although the functional units 56 may execute instructions out of order, the CPU 40 may or may not be permitted to complete the instructions in the same order, depending on architectural constraints.

The branch unit 54 includes a condition register used for evaluating the outcome of conditional branches, and logic that updates the condition register according to the results of operations performed by the functional units 56. The address that identifies the block of instructions to be fetched from the memory system 42 into the instruction queue 50 is stored in an instruction fetch register 64. The block address stored in the instruction fetch register 64 is supplied to the branch unit 54.

Each functional unit 56 may be capable of executing some or all types of the instructions forwarded via the decode and dispatch unit 52. The functional units 56 receive input source operands from and write the output results to the register file 60 and/or the data cache unit 46. In the alternative, the functional units 56 may be asymmetric, where a specific unit is capable of executing only certain subsets of instructions. In this case, the register file 60 is typically partitioned logically into subsets corresponding to the functionality of the functional units 56. Note that the logical partitioning of the register file 60 may be architecturally visible or invisible. Moreover, the register files 60 may be logically separate yet physically share common circuitry. In addition, the decode and dispatch unit 52 must be aware of this asymmetry and schedule the instructions appropriately. For example, the functional units 56 may include one or more fixed point units for performing fixed-point operations, one or more floating-point units for performing floating-point operations, and one or more vector units for performing vector operations on one or more source vectors. The fixed-point operations performed by the fixed point units may include, for example fixed-point addition, fixed-point subtraction, fixed-point multiplication, fixed-point division, AND, OR, XOR, fixed-point compare, fixed-point rotate, and fixed-point shift operations. The floating-point operations performed by the floating-point units may include, for example, floating-point addition, floating-point subtraction, floating-point multiplication, floating-point division and floating point compare operations. The vector operations performed by the vector units characteristically have an inherent high degree of parallelism. Typically, such vector operations are SIMD-style operations wherein an instruction performs the same operation on a multiple data elements within the source vectors.

The branch unit 54 also includes a branch prediction mechanism that comprises set selection information. If the branch prediction mechanism determines that the block of instructions does not include a conditional branch instruction, or includes one or more conditional branch instructions that are predicted to be not taken, then the branch prediction mechanism controls a multiplexor 66 to load the set and block address of the next sequential block address (generated by a next sequential block address generator 68) into the instruction fetch register 64. In this case, the next sequential block is fetched from the memory system 42 into the instruction queue 50. If the branch prediction mechanism determines that one or more of the instructions is a branch instruction predicted to be taken, the branch prediction mechanism controls the multiplexor 66 to load into the instruction fetch register 64 the set and block address of the target address. In this case the set and block that includes the target instruction of the first predicted taken branch instruction is fetched into the instruction queue 50 from the memory system 42. This process substantially decreases access latency of the instruction cache, and can be continued indefinitely getting farther and farther ahead of the block that the CPU 40 is currently executing. However, the size of the instruction buffer and the increasing probability that some branch will be incorrectly predicted by the branch prediction mechanism, in which case all further block pre-fetching will be useless, limits this process.

It is readily apparent that there may be more than one conditional branch instruction predicted to be taken within a block. For the mechanism to identify the first predicted taken conditional branch instruction, the byte address of the target instruction may be stored in the instruction fetch register 64, yet not utilized by the memory system 42 in fetching blocks of instructions. In this case, the byte address is supplied to the branch prediction mechanism to indicate the entry point of the target instruction in the block. The branch prediction mechanism utilizes the byte address of the target to identify the first conditional branch instruction predicted to be taken that occurs in sequence after the supplied entry point.

The branch prediction mechanism may derive set selection information from data stored in a BTB, OHT, instruction cache or decode history table. Descriptions of known branch prediction techniques may be found in the following references. The disclosure of these references are hereby incorporated by reference:

1. U.S. Pat. No. 3,559,183 to Sussenguth.
2. U.S. Pat. No. 4,477,872 to Losq et al.
3. J. Smith *A Study of Branch Prediction Strategies* $24^{th}$*Annual Symposium on Computer Architecture* pp.135–148 (May 1998).
4. Yeh and Patt *A Comparison of Dynamic Branch Predictors that use Two Levels of Branch History Conference Proceedings ^ Annual Symposium on Computer Architecture* pp. 257–266 (1993).
5. P. Emma, J. Pomerene, T. Puzak, R. Rechtschaffen and F. Sparacio *Operand History Table, IBM Technical Disclosure Bulletin* 12–84, p. 3815–3816.
6. Emma, J. Knight, J. Pomerene, T. Puzak, R. Rechtschaffen *Hedge Fetch History Table, IBM Technical Disclosure Bulletin* 02–89, p. 101–102.
7. U.S. Pat. No. 5,235,697 to Simon Stely Jr. et al.
8. U.S. Pat. No. 5,418,922 to L. Liu.
9. L. Liu, *Partial address directory for cache access. IEEE Transactions on Verv Larae Scale Integration (VLSI) Systems*, 2(2), June 1994, pp. 226–240. (Liu uses a fixed table called SETLAT, which is indexed using a portion of the load address to more quickly retrieve data from an associative cache. Since the SETLAT does not require translation and is narrower than the conventional directory, it enables faster selection of a set from a congruence class. Liu's invention can also be used to cache virtual address translations and enables multiple cache accesses per cycle.)
10. A. Agarwal and S. Pudar Column-Associative Caches: *A Technique for Reducing the Miss Rate of Direct-Mapped CachesÝ. The* $20^{th}$*Annual International Symposium on Computer Architecture* (1993) pp. 179–190. (Agarwal and Pudar disclose how to make a direct mapped cache perform like a two-way set associative cache using second-hashing. With this technique, they are able to obtain quicker access to the most recently used (MRU) element of a set.)
11. B. Calder and D. Grunwald and J. Emer, "Predictive sequential associative cache", IEEE High-Performance Computer Architecture Symposium Proceedings 1996, pp. 244–253. (In a work that builds on that of Agarwal and Pudar, Calder et al describe a way of using a predictive technique to select an appropriate cache hash probe for accessing a direct-mapped cache multiple times with a different hash probe each time.)

Again, referring to FIG. 7, the processor unit 40 may include additional hardware mechanisms that prefetch instructions and data into the cache memories 44, 46 before such information is requested by the processor unit 40. For example, the processor unit 40 may include prefetch stream buffers as set forth in Jouppi, "Improving Direct-mapped Cache Performance by the Addition of a Small Fully-Associative Cache and Pre-fetch buffers—Proc. Of $17^{th}$ annual Int'l Symposium on Computer Architecture", Seattle, May, 1990, IEEE Computer Society Press, pp. 364–373, and Palacharla et al. "Evaluating Streaming Buffers as a Secondary Cache Replacement—Proc. of $21^{st}$ Annual Int'l Symposium on Computer Architecture", Chicago, April, 1994, IEEE Computer Society Press, pp. 24–33, which are hereby incorporated by reference in their entirety.

In addition, prefetching instructions (i.e., instructions that prefetch instructions and data into the cache memories 44, 46 before such information is requested by the processor unit 40) may be inserted into the sequence of instructions stored in the memory system 42. Callahan et al, "Software Prefetch Proceedings of the Fourth International Conference on Architectural Support For Programming Languages and Operating Systems", April 1991, which is hereby incorporated by reference in its entirety, discloses adding new instructions that perform prefetching in the instruction set. In the PowerPC® processor developed jointly by IBM®, Motorola® and Apple®, the Data-Cache-Block-Touch (dcbt) instruction, commonly called a touch-instruction, is used to prefetch blocks of memory into the cache. In addition, U.S. Pat. No. 5,774,685 (Application No. 08/426, 502) to P. Dubey, commonly assigned to the assignee of the present invention and herein incorporated by reference in its entirety, describes a speculative touch instruction.

These prefetching instructions can be used to prefetch both instructions and data (operands) into the cache memories 44, 46. Generally, these prefetching instructions behave like a load instruction except that data is not transferred to the processor unit 40. More specifically, the processor unit 40 includes a mechanism to search a cache directory with the prefetch address and, if a miss occurs, transfers the information from the memory system 42 to the cache memory 44, 46. These prefetching instructions can be inserted by a compiler into the sequence of instructions ahead of the actual use of the information in an attempt to assure that the information will be available to the cache when needed. Unfortunately, it may not be possible for the compiler to insert prefetching instructions to avoid cache misses in all cases. For example, the prefetch address may not be known until the instruction that uses the data is executed. Consider a load instruction that references an operand indirectly. That is, a register loads a pointer saved in memory. In this case, the prefetch address is not known until the pointer that identifies the data is loaded.

In other cases, there may be little performance benefit gained from the prefetching instruction if it is placed too close to the actual use of the data. For example, placing a prefetched instruction only one instruction before the actual use of the information it fetches will have little, if any, performance benefit over not inserting the prefetching instructions at all. Thus, it may be beneficial to ignore non-useful prefetching instructions in some cases. An example of a mechanism for selectively executing prefetching instructions is described in the commonly assigned U.S. patent application Ser. No. 08/599,833 filed by T. Puzak, hereinafter incorporated by reference in its entirety.

In addition to prefetching instructions and data, the processor unit 40 may speculatively execute prefetched instructions. Such instructions are referred to as "speculative instructions" due to the fact that the execution results of such instructions may not be useful in the case that the speculation is wrong. Preferably, the processor unit 40 utilizes branch prediction to identify a path along which to speculatively execute instructions. In this light, the branch unit 54 evaluates the validity of the predictions based upon the resolution of conditional branch instructions. If a given prediction is determined to be valid (i.e., the speculation is valid), the execution results of those speculative instructions that depend upon the valid prediction are made permanent. However, if a given prediction is determined to be invalid (i.e., the speculation is invalid), any execution results of those speculative instructions that depend upon the invalid predictions are discarded, and the processing of such speculative instructions by the stages of the processor unit 40 may be terminated. Speculative instructions are preferably marked as such in the instruction queue 50.

In addition, the various stages of the processor unit 40 (branch unit 54, decode and dispatch unit 52, load/store unit 58, functional units 56) preferably store information that identifies those speculative instructions that are being executed by the given stage. In addition, the completion unit 62 preferably marks execution results of such speculative instructions as speculative. Upon determining that a given speculation is valid, the branch unit 54 operates cooperatively with the completion union 62 to mark the execution results of those speculative instructions that depend upon the valid prediction as permanent, thereby allowing the completion unit 62 to complete such instructions (i.e., write the execution results to the register file 60 or memory system 42). On the other hand, upon determining that a given prediction is invalid, the branch unit 54 preferably operates as follows: the branch unit 54 operates cooperatively with the instruction fetch unit 48 to discard those speculative instructions depending upon the invalid prediction that remains in the instruction queue 50; the branch unit 54 operates cooperatively with the completion unit 62 to discard execution results of those speculative instructions that depend upon the invalid prediction, thereby prohibiting the completion unit 62 from completing such instructions; and the branch unit 54 operates cooperatively with the various stages of the processor unit 40 to terminate processing of the speculative instructions that depend upon the invalid prediction.

Figure 8A:
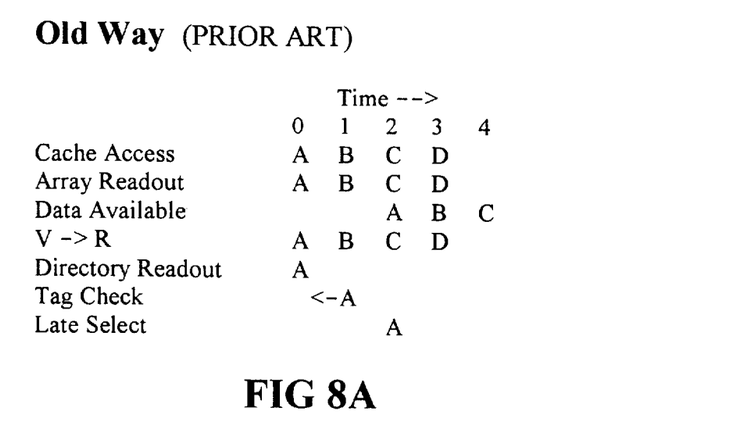
FIGS. 8A and 8B are timing diagrams illustrating cache accesses using a method of the prior art and that of the present invention, respectively.
Figure 8B:
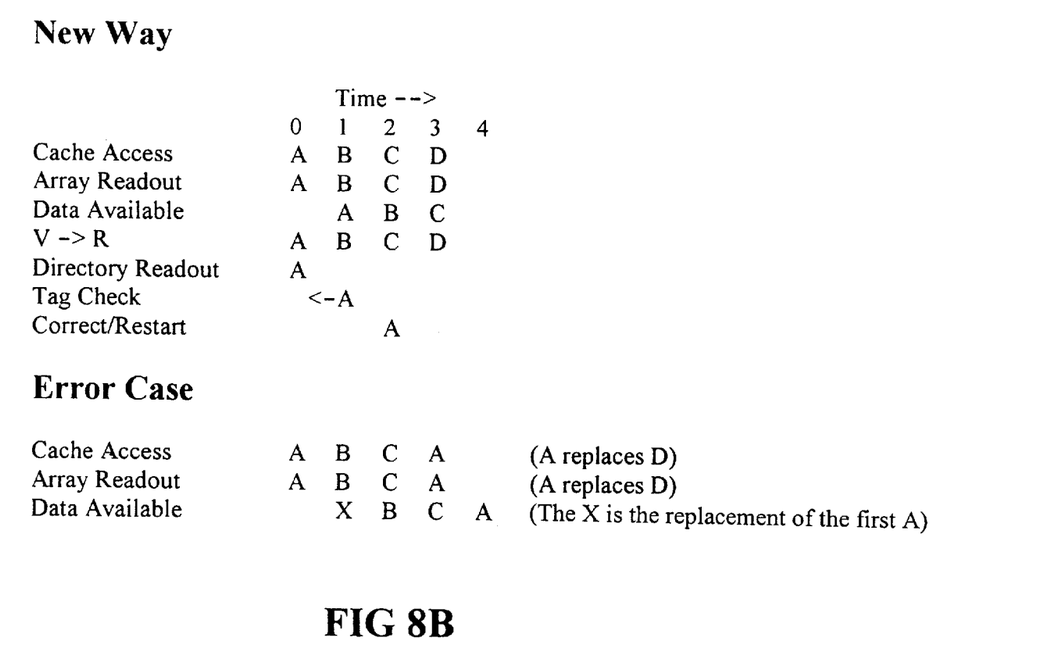

An example of using set prediction information is illustrated in FIGS. 8A and 8B. FIGS. 8A and 8B show a timing diagram for a heavily pipelined cache. FIG. 8A illustrates a prior method of pipelining without set prediction, and FIG. 8B illustrates a method using set prediction in accordance with the present invention. It can be seen that in the prior approach shown in FIG. 8A, cache access and array readout occur during time periods zero and one. At around the same time, virtual address translation (V→R), directory readout, and tag check are performed for data A. After Late Select (set indexed resolved), data A is made available during time period 2. Using the illustrative method of the present invention, as shown in FIG. 8B, Data A is available after array readout during time period '1', before Late Select is performed in period '2'. Data 'A' is then confirmed to be valid data in time period '2'.

In the case where set prediction is incorrect, the cache access, array readout and data-available steps must be performed a second time (during time period '3'). The data A is not made available until time 4. Note that Data 'B' and 'C' can be valid data. They are made available before re-validated Data 'A'.

Thus, while the particular embodiments of the present invention have been shown and described, various modifications will be apparent to those skilled in the art, and therefore it is not intended that the invention be limited to the disclosed embodiment or to details thereof and departures may be made therefrom within the spirit and scope of the present invention.

What is claimed is:

1. A method of increasing the access speed of a set-associative memory using data addresses, each of said addresses comprising an offset portion, a congruence class index, and a tag portion, said set associative memory comprising an array and a directory, said array storing data, said array partitioned into a plurality of array congruence classes, said array congruence classes partitioned into array sets, said array sets each comprising a cache line having data, said directory partitioned into plurality of direction congruence classes, said directory congruence classes partitioned into directory sets, said directory sets each comprising a directory entry, said directory entry comprising an address tag, said directory partitioned such that there is a one-to-one correspondence between said directory entries and said cache lines such that said address tags are associated with at least one of said cache lines, said method comprising the steps of:

accessing contents of sets of a single array congruence class using said congruence class index, said single array congruence class being specified by said congruence class index;

accessing contents of sets of a single directory congruence class using said congruence class index, said single directory congruence class being specified by said congruence class index;

generating set selection information;

utilizing said set selection information to select said sets of said array congruence class prior to output of said single congruence class specified by the directory;

outputting said data from said cache line in said selected set based on said set selection information.

2. The method according to claim 1, further comprising the steps of:

comparing said tag portion to said address tags of said selected sets of said directory congruence class;

comparing said selected set to said set selection information if one of said address tags in said selected congruence class is equal to said tag portion of said address;

outputting a first control signal to indicate that said access was unsuccessful, and that said data output from said cache line is invalid if none of said address tags in said selected congruence class is equal to said tag portion of said address; and outputting a second control signal to indicate that said data from said cache line is invalid if said selected set is not equal to said set selection information.

3. The method of claim 1, wherein said addresses comprise a first partitioning and a second partitioning, said first partitioning comprising an array offset portion, an array congruence class index, and an array tag portion, a second partitioning comprising a directory portion, a directory congruence class index, and a directory tag portion, wherein said array congruence class index and said directory congruence class index may be of different lengths, and wherein said array and said directory comprise different set associativities.

4. The method of claim 3, further comprising the step of utilizing said offset portion to select data from said cache line to be output.

5. The method of claim 1, further comprising the step of outputting data from said cache line in said selected set if a set other than the set that was predicted has an address tag that matches said array tag portion.

6. The method of claim 3, further comprising the step of outputting data from said cache line in said selected set if a set other than the set that was predicted comprises said address tag that matches said directory tag portion.

7. The method of claim 1, wherein said set selection information is provided by a branch target buffer.

8. The method of claim 3, wherein said set selection information for instruction accesses is provided by a branch target buffer.

9. The method of claim 1, wherein said set selection information for operand accesses is provided by prior instruction accesses.

10. The method of claim 3, wherein said set selection information for operand accesses is provided by prior instruction accesses.

11. The method of claim 1, wherein said set selection information for operand accesses is provided by an operand history table.

12. The method of claim 3, wherein said set selection information for operand accesses is provided by an operand history table.

* * * * *